(12) United States Patent
New

(10) Patent No.: US 7,311,445 B2
(45) Date of Patent: Dec. 25, 2007

(54) TILTING PAD BEARING ASSEMBLY

(75) Inventor: Nigel Henry New, Harrow (GB)

(73) Assignee: Delaware Capital Formation, Inc., Wilmington, DE (US)

( * ) Notice: Subject to any disclaimer, the term of this patent is extended or adjusted under 35 U.S.C. 154(b) by 165 days.

(21) Appl. No.: 11/118,214

(22) Filed: Apr. 29, 2005

(65) Prior Publication Data

US 2005/0244088 A1 Nov. 3, 2005

(30) Foreign Application Priority Data

Apr. 30, 2004 (GB) ................. 0409672.3

(51) Int. Cl.
*F16C 17/06* (2006.01)
*F16C 32/06* (2006.01)

(52) U.S. Cl. ...................... 384/117; 384/308

(58) Field of Classification Search ................ 384/117, 384/122, 308, 312; 29/898.02, 898.04, 898.041
See application file for complete search history.

(56) References Cited

U.S. PATENT DOCUMENTS

| | | | |
|---|---|---|---|
| 2,480,114 A | 8/1949 | Bradbury | |
| 4,746,230 A | 5/1988 | Jensen | |
| 5,288,153 A * | 2/1994 | Gardner | ........... 384/311 |
| 5,397,183 A | 3/1995 | Lu et al. | |
| 5,421,655 A | 6/1995 | Ide et al. | |
| 5,423,613 A | 6/1995 | Keck et al. | |
| 5,489,155 A | 2/1996 | Ide | |
| 5,513,917 A | 5/1996 | Ide et al. | |
| 5,531,522 A | 7/1996 | Ide et al. | |
| 5,603,574 A | 2/1997 | Ide et al. | |
| 5,743,654 A | 4/1998 | Ide et al. | |
| 5,795,076 A | 8/1998 | Ball et al. | |
| 5,879,085 A | 3/1999 | Ball et al. | |
| 6,736,542 B2 | 5/2004 | Hudson | |
| 2004/0032996 A1 | 2/2004 | Hudson | |

FOREIGN PATENT DOCUMENTS

| | | |
|---|---|---|
| DE | 195 17 224 A1 | 11/1996 |
| GB | 473278 | 9/1937 |
| GB | 2 107 001 A | 4/1983 |

* cited by examiner

*Primary Examiner*—Marcus Charles
(74) *Attorney, Agent, or Firm*—Foley & Lardner LLP

(57) ABSTRACT

A tilting pad bearing assembly consists of an array of bearing pads each supported on a rigid carrier by way of an intervening pivot ridge extending from the pad or carrier. The individual pad surfaces are able to tilt or rock to a limited extent about a pivot or fulcrum ridge. A pad hole depth permits a pin to be inserted via a carrier hole such that with the pad supported on the carrier the pin head is spaced slightly from a shoulder and the pad able to tilt. The assembly permits simplified manufacture by supporting the pads on their bearing surfaces, overlaying the carrier to effect contact at the pivot ridge and forcing the pins into the pads to the limits of the blind holes that gives the correct clearance with respect to the carrier.

8 Claims, 2 Drawing Sheets

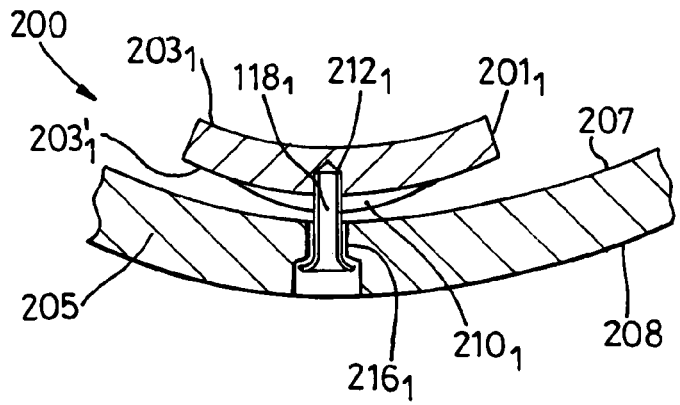
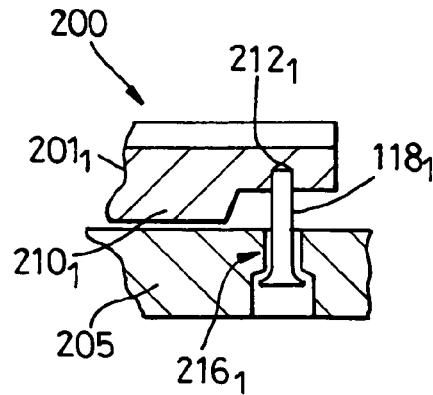
*Fig. 3(a)*      *Fig. 3(b)*
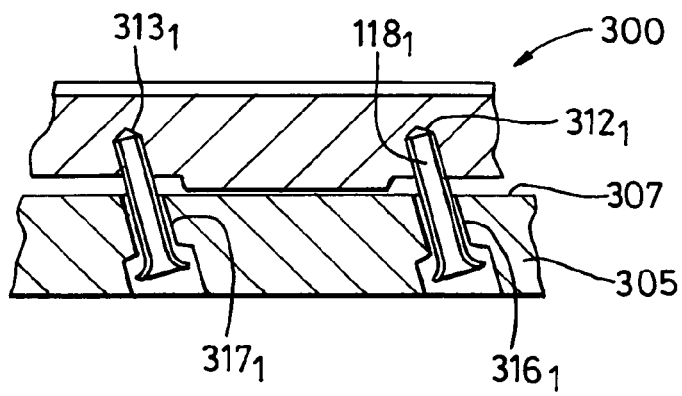
*Fig. 4*
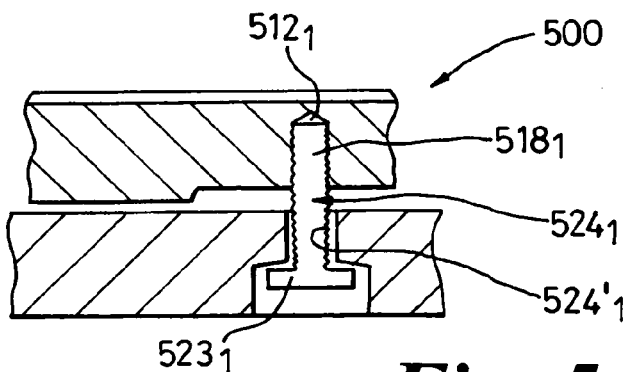
*Fig. 5*

TILTING PAD BEARING ASSEMBLY

CROSS-REFERENCE TO RELATED PATENT APPLICATIONS

This application claims the benefit under 35 U.S.C. § 119 of United Kingdom Application 0409672.3, filed Apr. 30, 2004, incorporated herein by this reference in its entirety.

FIELD

This invention relates to tilting pad bearing arrangements for apparatus having a rotatable shaft or the like, about which shaft are arrayed a plurality of bearing pad surfaces, and in which individual pad surfaces are able to tilt or rock to a limited extent about a pivot or fulcrum ridge.

BACKGROUND OF THE INVENTION

Bearing arrangements are known for both thrust bearing arrangements and journal bearing arrangements. It is convenient to discuss one type only, say thrust bearing arrangements, knowing that comparable points relate to the other type Tilting pad thrust bearing arrangements are well known per se for supporting such a rotatable shaft subject to forces along the axis of rotation by having an axially facing collar, affixed to the shaft, bear against axially facing thrust bearing pads which in turn bear against a supporting carrier member and relative to which they can tilt to alter the relationship between the bearing surfaces of the pads and the shaft borne collar surface.

The supporting carrier is formed either as a metal ring of such thickness as to support the thrust loads without deformation or sometimes as a prepared surface of the apparatus housing the bearing arrangement. In either case it is conventional, but not mandatory, for the pad-supporting face of the carrier to be substantially planar, except possibly for lubricant nozzles at the surface at locations between adjacent pads, and for the face of each thrust pad opposite to a bearing surface to bear on the carrier over an area smaller than the area of the pad face, effectively defining a fulcrum ridge or shoulder at the surface of one or both by way of which the pad is supported on said supporting face of the carrier and about which pivot or ridge it is able to make limited tilting movements The pad and/or carrier face may be machined away other than at a central or circumferentially offset location to leave a radially-extending pivot or fulcrum ridge.

It is known from GB-A-2107001 to mount each bearing pad of the ring array with respect to the pad-supporting face of the carrier, against relative displacement in circumferential, radial and axial directions, by means of a pair of locating pins which extend at an angle to each other between respective locating holes in the pad and carrier, each pin being fixed with respect to one of the pad or carrier and a slack fit with respect to the other so as to allow the pad to pivot about its pivot/ridge with respect to the carrier. The pad is retained with respect to the carrier by virtue of abutment between the sides of the holes and the shanks of the pins. For preference, the locating pins lie in a plane passing through the pivotal axis of the pad, most conveniently at or near the opposite ends of the fulcrum ridge, the separation, divergence of pin axes and slack locating in one hole of the pair associated with each pin being such as to permit the pad and carrier to be located with respect to each other by manipulation involving movement in at least two directions that would not occur in use to permit accidental separation.

It is, however, a relatively complex manipulation to locate and remove individual bearing pads of the ring assembly and has to be performed manually by practised personnel.

It is also known to locate such a bearing pad by means of conventional headed screws which extend parallel to each other in a generally axial direction through clearance holes in the carrier into threaded engagement with holes in the bearing pad, the clearance with respect to the carrier being both radially with respect to the shank of each screw and also axially with respect to its head to permit the limited tilting of the pad and screws relative to the carrier. The use of such threaded screws does of course introduce additional manufacturing steps in provided threaded and countersunk clearance holes, as well as requiring locking means to prevent them coming loose.

Similar considerations apply in respect of mounting pads of journal bearings, in respect of locating them against displacement from a carrier that in use surrounds and is radially disposed with respect to a shaft.

There is a class of bearing implementation where cost is an overriding factor. Bearings assemblies of carrier and tilting pads for such uses typically operate for the life of the apparatus to which fitted or, if less, entail the whole bearing being replaced rather than disassembled for replacement of individual pads, the assembly of bearing carrier and pads being discarded by the user.

In such a throw-away environment it becomes important to be able to manufacture and install the bearing arrangement simply and at low cost. It is also important with regard to recent and forthcoming waste disposal legislation that such a bearing be manufactured with as few different materials as possible and readily broken apart to permit final disposal or re-cycling.

Thus one of the principal requirements is for the discrete pads and carrier to be manufactured individually and pre-assembled cheaply before use. This includes operations to be performed in manufacturing the component parts themselves and in the skill and time required for assembly. It follows that such pre-assembly must result in a product that is stable insofar as it can be transported, handled and manipulated for installation (or removal) without disturbing the relationship between pads and carrier.

SUMMARY OF THE INVENTION

The present invention provides a tilting pad bearing of simple construction and facilitating simpler assembly than previous arrangements.

According to a first aspect there is provided a tilting pad bearing assembly comprises a plurality of discrete bearing pads, each having a bearing face across which a borne surface moves and opposite thereto a supported face, and a substantially rigid carrier therefor, said carrier having a supporting face facing the supported face of each bearing pad and opposite thereto a reverse face, each said bearing pad being supported on the carrier overlying an associated region thereof by way of an intervening pivot ridge extending in a direction substantially transversely to the direction of said borne surface movement and about which the pad can tilt, there being provided for each bearing pad a pair of pad holes extending into the pad from the supported face towards the supporting face thereof, said pad holes being spaced apart along the direction of the pivot ridge, providing a pair of carrier holes extending into the carrier from said supporting face towards the reverse face, said carrier holes being spaced apart in said region in correspondence with the associated pad holes, at least one of said carrier holes extending through the carrier between said supporting face and reverse face and including a shoulder facing away from the supporting face, and a pair of locating pin members extending each between aligned pairs of pad and carrier holes, at least one of said pin members comprising a shank forming an interference fit in a pad hole; the pivot ridge projects from at least one of the pad supported face and carrier supporting face region towards the other, and at least one of the pin members forms a clearance fit in the aligned carrier hole, at least one of said pin members that forms a said interference fit in a said pad hole and clearance fit in the aligned carrier hole comprising a flared, headed pin member disposed with said shank extending through the carrier and a head adjacent to but spaced from the shoulder, when the pad and carrier are in contact by way of the pivot ridge, by a clearance and permitting the pin and pad to tilt with respect to the carrier.

There is also provided a method of manufacturing a sliding bearing assembly of an array of bearing pads mounted on a carrier each said pad being operable to tilt relative to the carrier about a pivot ridge. The method comprises the steps of:

providing a plurality of bearing pads each having on opposite sides thereof a load supporting face by which a load is borne and a supported face by which the pad is supported, providing a carrier body having on opposite sides thereof a supporting face for a plurality of said pads and a reverse face, said pad-supporting face comprising a plurality of regions operationally aligned with overlying pads, providing for each bearing pad and associated carrier supporting face region a pivot ridge, providing for each bearing pad a pair of pad holes extending into the pad from the supported face towards the supporting face thereof, said pad holes being spaced apart along the direction of the pivot ridge, providing a pair of carrier holes extending into the carrier from said supporting face towards the reverse face, said carrier holes being spaced apart in said region in correspondence with the associated pad holes, at least one of the carrier holes of each said pair extending through the carrier body to said reverse face and including a shoulder facing away from the supporting face, supporting the bearing pads in said array with the supporting face of each against a stop, disposing the carrier with said regions of its supporting face overlying and abutting the associated pads by way of the ridge projections and with said pad holes and carrier holes in alignment, disposing a pad locating pin member in each said pair of aligned holes, the method being characterized by forming the pivot ridge projecting from at least one of the bearing pad supported face and carrier supporting face region towards the other, introducing into at least one pad hole of each said pair by way of the carrier hole a headed pin having a shank that is a friction fit in the pad hole and a clearance fit in the carrier hole, and forcing the pin into the pad hole until the head lies adjacent to but spaced from abutment with the shoulder of the carrier hole by a distance permitting the pad to pivot with respect to the carrier face about said pivot ridge.

For convenience in this specification each pair of locating holes in the pad or carrier is referred to as a 'spaced pair' and each pair of locating holes aligned axially end to end in the adjacent pad and carrier are referred to as an 'aligned pair'.

The bearing arrangement may be a thrust bearing arrangement, in which the bearing pads have a substantially flat bearing surfaces, or a journal bearing arrangement, in which the bearing pads have bearing surfaces conforming to a section of a cylinder.

BRIEF DESCRIPTION OF THE DRAWINGS

Exemplary embodiments of a tilting pad bearing assembly will now be described by way of example with reference to the accompanying drawings, in which:—

FIG. 4 is a fragmentary sectional elevation similar to FIG. 1 but showing the aligned hole pairs extending parallel to each other but not perpendicularly with respect to the supporting face of the carrier, and a pair of locating pin members extending therethrough, FIG. 5 is a fragmentary sectional elevation, similar to that of FIG. 1 through a carrier and supported pad showing an alternative form of headed pin.

DETAILED DESCRIPTION OF EXEMPLARY EMBODIMENTS

Figure 1:
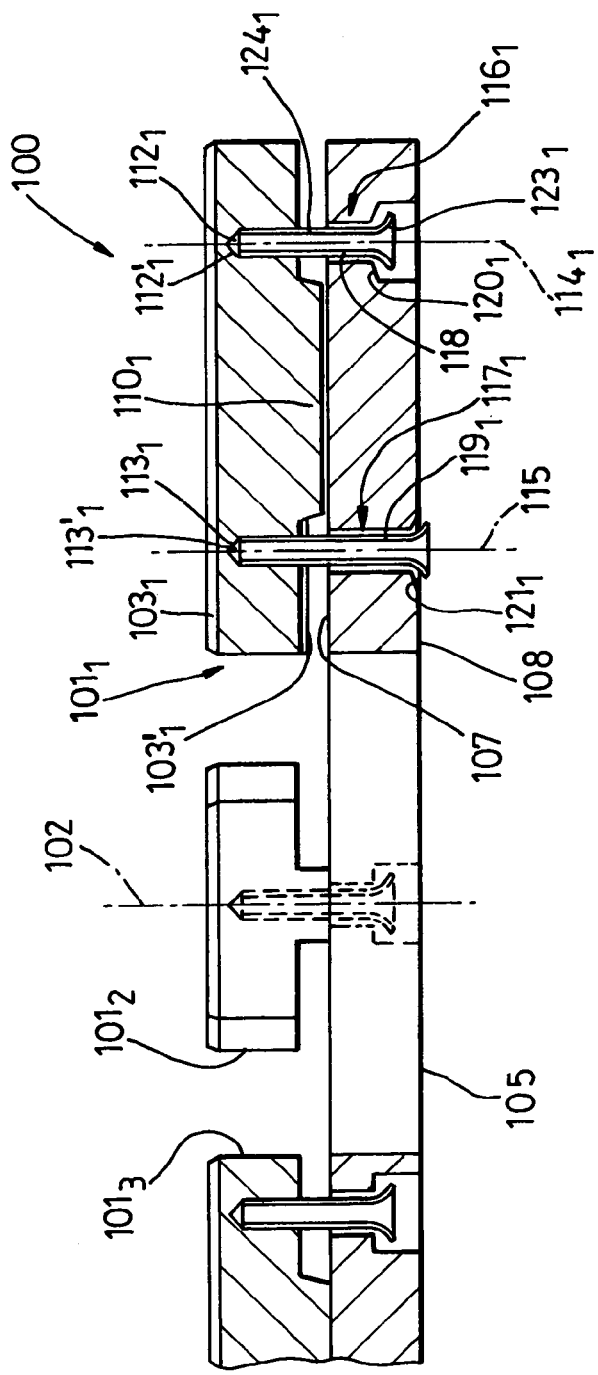
FIG. 1 is a sectional elevation through a tilting pad thrust bearing arrangement in which a plurality of bearing pads are arrayed about a longitudinal axis and supported on a rigid carrier ring by way of an intervening pivot/ridge, each pad located and secured with respect to the carrier means by way of a pair of parallel, radially contractible, headed spring pins disposed in line with and beyond each end of the ridge and extending axially between aligned holes in the pad and carrier and forming an interference fit in the pad.

Referring to FIG. 1, a tilting pad thrust bearing arrangement 100 comprises a plurality of discrete bearings pads $101_1, 101_2 \ldots$ arrayed about a longitudinal axis 102 as a ring of pads. Each pad has an axially facing bearing face $103_1$, $103_2, \ldots$, respectively extending in a circumferential and radial direction with respect to axis 102 on which to bear in use a thrust collar surface (not shown) and across which the borne collar surface moves in operation in a circumferential direction by rotation about axis 102. Opposite to the bearing face of each pad is a supported face $103'_1, 103'_2 \ldots$ and a substantially rigid carrier 105, in the form of a ring, has an annular, substantially planar, supporting face 107 facing axially towards the supported faces of the bearing pads. On the opposite side of the carrier a face 108 faces away from the supported faces of the bearing pads.

The bearing pad $101_1$ overlies an associated region of the carrier face 107 and is supported on the face by way of an intervening pivot ridge $110_1$ projecting from the supported face $103'_1$ by local thickening of pad $101_1$ and about which the pad can tilt, the ridge extending in a radial direction, that is, substantially transversely to the direction of the said borne surface movement. The ridge has a substantially flat plateau, parallel to the bearing face $103_1$ so that in use the pad tends to tilt about an edge of the ridge slightly displaced from its central radially extending axis.

The supported face $103'_1$ of bearing pad $101_1$ has opening thereto a pair of locating holes $112_1$ and $113_1$ separated at said opening of each in the (radial) direction by more than the length of the pivot/ridge. The holes are blind, and terminate at end abutments $112'_1$ and $113'_1$ respectively, and extend parallel to each other into the pad in a direction substantially orthogonally to the supporting surface 107, that is parallel to the longitudinal axis 102 of the bearing. The locating holes $112_1$ and $113_1$ of the pair may be conveniently referred to as the 'spaced pair' of locating holes associated with the pad. The individual locating holes of this spaced pair are aligned along a common longitudinal hole axis $114_1$ and $115_1$ respectively and in end-to-end relationship with a corresponding pair of holes $116_1$ and $117_1$ extending through the carrier between the supporting face 107 and reverse face 108 thereof. For convenience in description, the axially aligned locating holes $112_1$ and $116_1$ may be referred to as an 'aligned pair', as may $113_1$ and $117_1$. For clarity of description the locating holes $112_1$ and $113_1$ in the pad are referred to as 'pad holes' or 'pad locating holes' and the holes $116_1$ and $117_1$ in the carrier as 'carrier holes' or 'carrier locating holes', notwithstanding that the holes in the carrier determine the location occupied by the pad in relation to the carrier.

The holes $116_1$ and $117_1$ of the carrier pair are of a greater cross section than the holes $112_1$ and $113_1$ in the pads as will become clear from the description below.

To locate the bearing pad 101 with respect to the carrier a pair of locating members extends in and between the locating holes of each aligned pair. A radially contractible spring pin $118_1$ extends along and between aligned holes $112_1$ and $116_1$ forming an axially restrained interference fit within each pad hole, preferably along the whole of the contained length. A similar pin $119_1$ extends along and between holes $113_1$ and $117_1$.

Each of the carrier holes is conveniently circular in cross-section and of slightly large diameter than the corresponding pad hole such that the pin is able to pass through with a clearance. At least one of the carrier holes of the spaced pair ($116_1$ or $117_1$) has associated therewith a variation in diameter, manifested as a shoulder that may be within the hole, that is, between the carrier supporting face 107 and reverse face 108 as is shown by shoulder $120_1$ for the hole $116_1$, or may be at the end of the hole, adjacent to the reverse face 108, as is shown by shoulder $121_1$ for the hole $117_1$. Both holes may of course be the same, of either form.

The shoulder $120_1$ may taper (as shown) within the hole or the hole $121_1$ taper at the end of the hole to facilitate passage of the pin from the reverse face, or (not shown) each shoulder may be a simple step change in hole diameter, again, within the hole or at the end of the hole where the shoulder may then comprise the reverse face 108 surrounding the hole. However, unless the application involves supporting the carrier on posts or the like, normally the shoulder and end region of the pin would be recessed within a counterbore to avoid the carrier resting on the pin heads.

The pin $118_1$ (and/or $119_1$) has at one end a "head" $123_1$ formed by flaring of the tubular form that defines a shank $124_1$. Such a pin may be of the type identified as Series 400 (headed coiled pins) or series 410 (flared coiled pins) available from Spirol Precision Engineered Products, 30 Rock avenue, Danielson, Conn. USA.

Assembly of the bearing may comprise laying the pads with the load supporting faces $103_1$ etc against a stop, such as on a bench in a circular array with their bearing surfaces $103_1$ etc downwards and against the bench and the support faces $103'_1$ and their pivot ridges $110_1$ etc upwardly facing, then laying the carrier upon the pivot ridges and aligning the hole pair $112_1$ and $116_1$ and the pair $113_1$ and $117_1$ etc. Then a headed (or flared) spring pin having a diameter slightly larger than a pad hole is inserted into that pad hole by passing it through the carrier hole and applying axial pressure between pin and bench (pad) such that the pin is forced to contract to become inserted in, and retained by frictional interference with, the pad hole and with the pivot ridge of the pad abutting the supporting face of the carrier. One or each of the length of carrier hole between shoulder and surface 107, the length of the pin and the depth of the pad hole is chosen such that the pin ($118_1$) can be driven into the pad hole ($112_1$) until it abuts the blind end abutment ($112'_1$) of the hole but leave a small clearance between the pin head x and the shoulder $120_1$. It follows that each of the headed pins may be inserted into the carrier holes and/or forced into the pad holes simultaneously.

Thus, when the bearing arrangement is subsequently moved and used each pad is prevented by each headed pin associated therewith from significant movement axially away from the carrier supporting surface and, by the existence of spaced apart pins, from moving in other directions parallel to the carrier supporting surface. It will be appreciated that it is not essential for both pins or a pair to be headed, but it is preferable.

It will also be appreciated that although the pad cannot move away from the carrier (supporting surface 107), insofar as the hole $116_1$ etc is of a larger diameter than the shank $123_1$ of the pin the pin is able to undertake a limited amount of movement with respect to the carrier that permits the pad to tilt about the pivot ridge $110_1$.

Insofar as the head of the pin is formed by flaring of the pin, it is preferred that the shoulder $120_1$ or $121_1$ has a tapered, countersunk form so that the pin head seats against it, whereby the pad tends to be centralised in position with respect to the carrier although if the head is formed by gentle flaring of the pin shank the flaring may effect such centralising. In the extreme, the taper may extend for the full length of any hole or hole section.

Notwithstanding the frictional interference fit between locating pins and pad holes, it will be appreciated that if necessary the pad may be removed by exerting appropriate force in an axial direction. This may be appropriate to repairing or prolonging the life of the bearing or simplifying its destruction after use.

Figure 2:
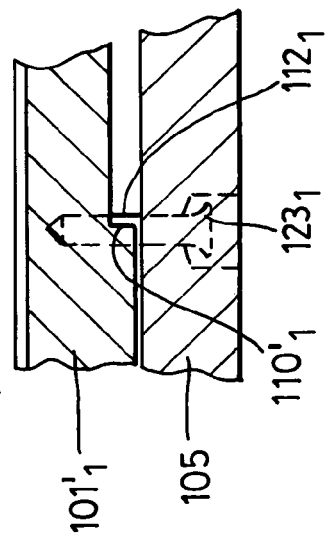
FIG. 2 is a fragmentary sectional elevation, similar to FIG. 1, of an alternative tilting pad arrangement in which the ridge is formed on the supported face of the bearing pad by a shoulder, permitting the pad to tilt in one direction only, and the locating holes are in line with the shoulder, FIGS. 3($a$) and 3($b$) are fragmentary sectional elevations, of a tilting pad journal bearing, in which the pivot ridge is formed by an exaggerated curvature of the supported face of the bearing pad.

In the arrangement 100 of FIG. 1 the aligned pairs of locating holes are disposed in line with the centre of the pivot/ridge, and permit tilting of the pad in either direction. The ridge shown with a flat plateau and step sides, but it may be formed with rounded peak and/or sides. If the pad requires to tilt in one direction only, then as shown in FIG. 2 in a fragmentary sectional elevation, a bearing arrangement 100' incorporating a modified form of bearing pad $101'_1$ has the pivot ridge formed as a simple shoulder or step $110'_1$ extending coincidentally with the line joining the two locating pins.

It will be appreciated also that such pivot ridges $110_1$ or $110'_1$ may be formed integrally with the carrier supporting face 107 rather than the supported face of the pad or have a part formed by each. Alternatively such pivot ridge may be secured to, rather than be formed integrally with, either such face. Notwithstanding the precise structure, prior to assembly there exists only a prescribed number of pads and a carrier to lay out and hold together by simple and non-skilled pin insertions.

It will be appreciated that a significant area of engagement between the locating pins and the pad holes offers maximum protection against inadvertent separation in an axial direction and to this end, it is convenient to have conventionally drilled holes which are circular in cross-section and spring pins likewise circular and slightly oversized to be contracted by the walls of the holes to the desired degree of interference fit.

It will be appreciated that where such risk of separation is minimal, the pad holes and/or the locating pins may take a different cross-sectional form from circular and/or each other and grip by interference about only part of their peripheries.

The carrier hole of any aligned pair may be elongated in a circumferential direction, with respect to the direction of shaft rotation, permitting relatively easy tilting between the pivot and hole during pad tilting whilst a tighter, possibly near-interfering, fit between the pin and hole in the radial direction secures the pad and carrier in respect of relative radial motion and the abutment between the pin head and carrier secures them against all but minor separation axially.

Thus irrespective of the form taken by the pin, there is no complex manufacturing steps to be taken in respect of the pad holes; these may be simple drillings. Likewise the carrier holes may be simple drillings, with countersinking from one face. The locating members take the form of simple, and cheaply commercially available pins forced into the holes to be retained by frictional interference. Furthermore each of the pins may be inserted and/or forced into their final positions simultaneously. Thus the bearing arrangement/assembly may be manufactured without complex and cost-increasing machining steps for the component parts and assembled simply without special skills, both of which enable production of a low-cost, and economically disposable item.

Although the above description has related exclusively to a tilting pad thrust bearing, it will be appreciated, by reference to FIGS. 3(a) and 3(b) that the tilting pad bearing may also take the form a journal bearing 200. The carrier 205 comprises an essentially cylindrical supporting face 207 on which is supported a plurality of bearing pads $201_1$ etc each having a substantially cylindrical bearing face $203_1$ corresponding to the curvature of a shaft or like rotor (not shown) to be borne thereby and opposite thereto a supported surface $203'_1$ having a pivot ridge 210, formed by said face having a radius of curvature smaller than the supporting face 207 of the carrier, extending transversely to the direction of motion of the borne surface. The length of the pivot/ridge in the direction parallel to the rotation axis is shorter than the distance between the spaced locating holes extending perpendicular to the pivot ridge in the bearing pad and holes through the carrier respectively to form pairs of aligned locating holes (one pair only shown at 212 and $216_1$) between which holes of each aligned pair extends a locating pin $118_1$, at least one of which is headed, that is an interference fit in the pad hole and a clearance fit in the carrier hole, including the shoulder thereof as described above.

Notwithstanding the form of bearing pad nor the form of locating member, the spaced holes in the bearing pad may, provided they both extend in a plane containing the pivot ridge and providing the holes of the carrier and pad are aligned, extend other than orthogonal to the supporting face and/or other than parallel to each other. As illustrated in FIG. 4 for bearing arrangement 300 the locating holes $312_1$, $313_1$ are parallel but inclined at an acute angle with respect to the supporting surface 307 of carrier 305, as are carrier holes $316_1$ and $317_1$. It will be appreciated that the spaced pair $312_1$, $316_1$ and $313_1$, $317_1$ may be inclined with respect to each other and the supporting surface, requiring at least one of the headed locating pin members ($118_1$) to be inserted by way of a through-hole in the carrier.

It will be appreciated that a number of variations may be made to the above described bearing assembly structure and method. For example, although the pins are shown extending across a gap between carrier and pad spaced from the ends of the pivot ridge, they may extend through pivot if desired. Furthermore, if one hole in the carrier is not intended to house a headed pin, as it only need to prevent rotation, not only may the shoulder be omitted but the carrier hole itself may be blind and a clearance fit with respect to a pin disposed between carrier and pin faces during assembly.

The pivot ridges may be formed projecting from the carrier face (107) in the region overlaid by an associated pad or may have co-operating parts projecting from both. Furthermore, any such projecting ridge may be affixed to the respective pad or carrier region rather than being integral therewith.

Although each pad is mounted by way of a pair of spaced holes and locating pin members it will be appreciated that there may be a larger number of such holes and pin members, the minimum being a pair.

In all of the above described embodiments, radially contractible pins of a curled rather than spirally coiled form may be used.

Although forming locating members radially contractible spring pins permits low cost manufacture with the possibility of additional benefits from the spring-like nature of the pins, the ability to effect axial restraint whilst permitting limited tilting may be achieved, as shown in FIG. 5 for bearing arrangement 500, by employing headed pin locating members such as $518_1$ in the form of solid pins each of which has a head $523_1$ and along part of its shank $524_1$ a surface $524'_1$ that is barbed or the like so as to deform and effect an interference fit with a plain hole $512_1$ in the pad.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

What is claimed is:

1. A tilting pad bearing assembly comprising a plurality of discrete bearing pads, each having a bearing face across which a borne surface moves and opposite thereto a supported face, and a substantially rigid carrier therefor, said carrier having a supporting face facing the supported face of each bearing pad and opposite thereto a reverse face, each said bearing pad being supported on the carrier overlying an associated region thereof by way of an intervening pivot ridge extending in a direction substantially transversely to the direction of said borne surface movement and about which the pad can tilt, there being provided for each bearing pad a pair of pad holes extending into the pad from the supported face towards the supporting face thereof, said pad holes being spaced apart along the direction of the pivot ridge, providing a pair of carrier holes extending into the carrier from said supporting face towards the reverse face, said carrier holes being spaced apart in said region in correspondence with the associated pad holes at least one of said carrier holes extending through the carrier between said supporting face and reverse face and including a shoulder facing away from the supporting face, and a pair of locating pin members extending each between aligned pairs of pad and carrier holes, at least one of said pin members comprising a shank forming an interference fit in a pad hole; the pivot ridge projecting from at least one of the pad supported face and carrier supporting face region towards the other, and at least one of the pin members forming a clearance fit in the aligned carrier hole, at least one of said pin members that forms a said interference fit in a said pad hole and clearance fit in the aligned carrier hole comprising a flared, headed pin member disposed with said shank extending through the carrier and a head adjacent to but spaced from the shoulder, when the pad and carrier are in contact by way of the pivot ridge, by a clearance and permitting the pin and pad to tilt with respect to the carrier.

2. The assembly according to claim 1 in which the pivot ridge projection is integral with one of the pad and carrier.

3. The assembly as claimed in claim 1 in which the headed pin member has the head defined by flaring of the shank.

4. The assembly according to claim 3 in which the headed pin member is a hollow resiliently contractible spring pin.

5. The assembly according to claim 1 in which the shoulder of the carrier hole is configured as a tapered countersink.

6. The assembly according to claim 1 in which each pair of spaced apart pad holes has therein a said headed locating pin member.

7. The assembly according to claim 1 in which at least said one pad hole has an abutment limiting travel of the pin member shank therein, each headed pin contained in a pad hole has its shank against the travel limiting abutment thereof.

8. The assembly according to claim 1 in which the bearing is a thrust bearing and the pads are arrayed in a ring overlying an annular carrier, and the shanks of all the headed pin members are parallel to each other.

\* \* \* \* \*